United States Patent
Lipka et al.

(10) Patent No.: US 11,704,466 B2
(45) Date of Patent: Jul. 18, 2023

(54) ROUTING WITH SOFT-PENALIZING PIXELS ON A FOUND PATH

(71) Applicant: Microsoft Technology Licensing, LLC, Redmond, WA (US)

(72) Inventors: Matus Lipka, Kirkland, WA (US); Kenneth Reneris, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/819,730

(22) Filed: Aug. 15, 2022

(65) Prior Publication Data

US 2022/0391573 A1    Dec. 8, 2022

Related U.S. Application Data

(63) Continuation of application No. 17/235,878, filed on Apr. 20, 2021, now Pat. No. 11,461,529.

(51) Int. Cl.
 *G06F 30/394* (2020.01)
 *G06F 111/04* (2020.01)

(52) U.S. Cl.
 CPC ........ *G06F 30/394* (2020.01); *G06F 2111/04* (2020.01)

(58) Field of Classification Search
 USPC ......................................................... 716/126
 See application file for complete search history.

(56) References Cited

U.S. PATENT DOCUMENTS

| | | |
|---|---|---|
| 2010/0276736 A1 | 11/2010 | Bocko et al. |
| 2012/0119066 A1 | 5/2012 | Hadfield |
| 2019/0086200 A1 | 3/2019 | Amit |
| 2022/0050381 A1 | 2/2022 | Biswas et al. |

OTHER PUBLICATIONS

Chen, et al., "Global and Detailed Routing", In Book of Electronic Design Automation, Chapter 12, 2009, pp. 687-749.
Hu, et al., "Completing High-Quality Global Routes", In Proceedings of the 19th International Symposium on Physical Design, Mar. 14, 2010, pp. 35-41.
"International Search Report and Written Opinion Issued in PCT Application No. PCT/US22/022979", dated Jul. 19, 2022, 14 Pages.
"Notice of Allowances Issued in U.S. Appl. No. 17/235,878", dated May 17, 2022, 10 Pages.

*Primary Examiner* — Mohammed Alam
(74) *Attorney, Agent, or Firm* — Fountainhead Law Group PC

(57) ABSTRACT

Routing a circuit path includes selecting pixels on the circuit path based at least on penalty values associated with the pixels. Pixels on a rejected circuit path are penalized by increasing their penalty values. Re-routing a rejected circuit path allows for pixels on previously rejected paths to be considered when rerouting the rejected circuit path, rather than being eliminated outright.

20 Claims, 18 Drawing Sheets

ROUTING WITH SOFT-PENALIZING PIXELS ON A FOUND PATH

CROSS REFERENCE TO RELATED APPLICATIONS

This application is a continuation application and, pursuant to 35 U.S.C. § 120, is entitled to and claims the benefit of earlier filed application U.S. application Ser. No. 17/235,878 filed Apr. 20, 2021, the content of which is incorporated herein by reference in its entirety for all purposes.

BACKGROUND

The design of integrated circuits grows in complexity as the feature sizes of circuits shrink from one design generation to the next. As the count of circuits grows on a given die size, the number of pins or conductors that need to be routed between logical elements grows roughly at an inverse square relationship to the size of the smallest circuit feature. Accordingly, routing, and in particular detailed routing, between and among pins has become more complex as the technology advances.

Routing a circuit design involves determining the design in accordance with routes for metal wires which electrically connect circuit elements to produce routed circuits that perform desired functions. Unfortunately, routing wires of a large circuit design can take several days using present routing techniques. To exacerbate the process, a detailed routing operation is not always guaranteed to succeed, and the process has to start over.

Further complexity occurs because the number of design rules that limit the allowable geometries adds to the set of calculations necessary when performing detailed routing. Superconducting circuits have more routing constraints than traditional complementary metal-oxide semiconductor (CMOS) circuits. Often a route is found but it violates some constraint, and the path is rejected. However, the ideal path may need to use part of the rejected path, or more seriously, no route may exist absent using part of the reject path which would require moving previously placed and routed circuit elements and/or previously determined circuit paths.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
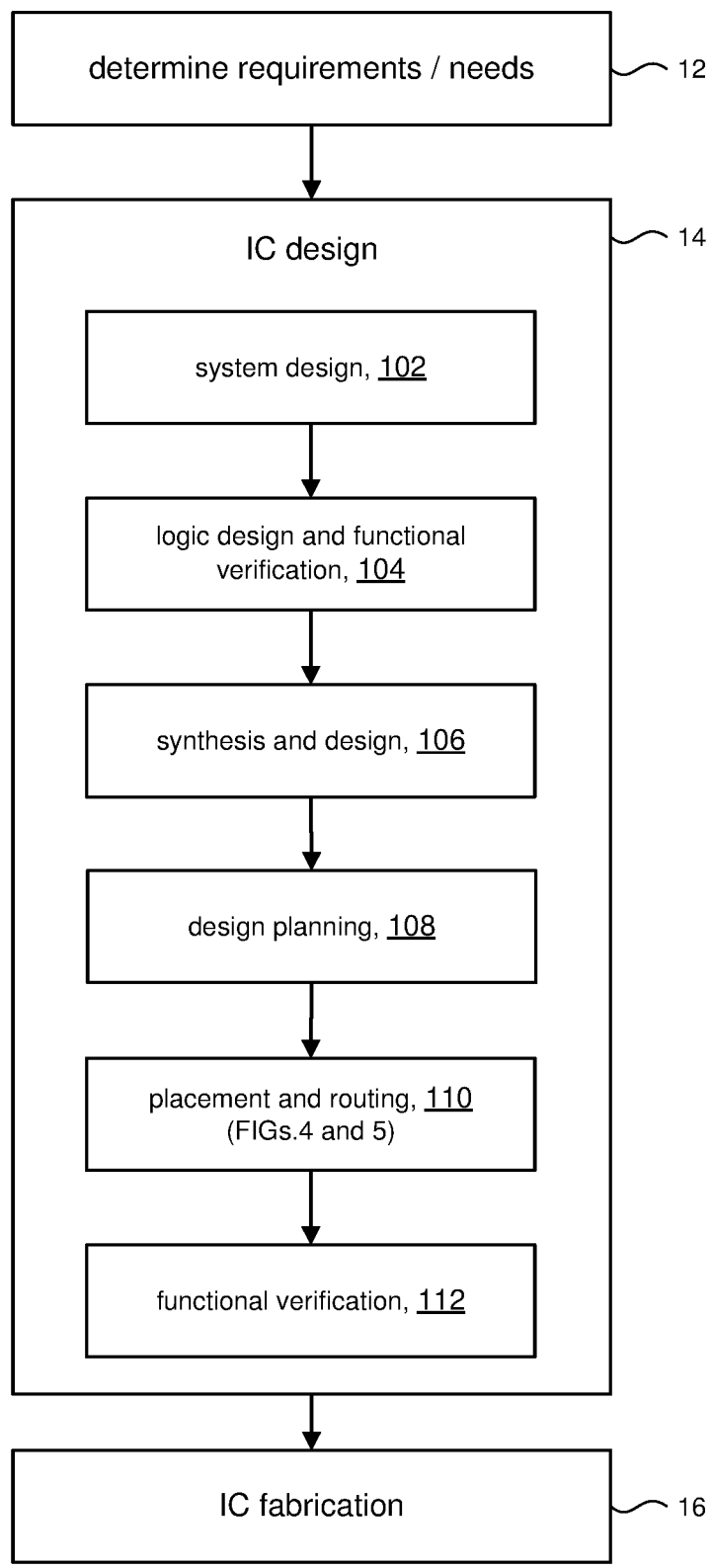
FIG. 1 depicts a simplified block diagram of a system environment according to certain embodiments.

FIG. 1 illustrates various stages in the design and fabrication process of an integrated circuit (IC) in accordance with some embodiments of the present invention. An initial stage in the process is the determining requirements and needs stage 12, where the requirements and needs of the customers who use the IC are identified. IC design can then proceed to the next stage.

The IC design stage 14 typically begins with the electronic design automation (EDA) process. EDA can begin with the system design stage 102 which includes designing the functionality to be provided or performed by the IC. Logic design and functional verification 104 includes developing the logic modules using suitable design specification tools such as VHSIC (Very High Speed Integrated Circuits) Hardware Description Language (VHDL), Verilog code, and the like, and verifying the design for functionality and operating response. Synthesis and design 106 includes translating or otherwise converting the VHDL or Verilog code to a netlist, which specifies components of a circuit design and their interconnections. Design planning 108 includes constructing a high-level floorplan (global routing) to determine placement of the major blocks of logic comprising the IC. Placement and routing 110 includes placement of the circuit elements and routing interconnections between the circuit elements, sometimes referred to as detailed routing. This aspect of the design process is discussed in more detail below. Functional verification 112 includes verifying operation of the IC to ensure the design meets the functional requirements of the IC.

After the design process, the IC fabrication stage 16 can commence to produce finished chips.

Figure 2:
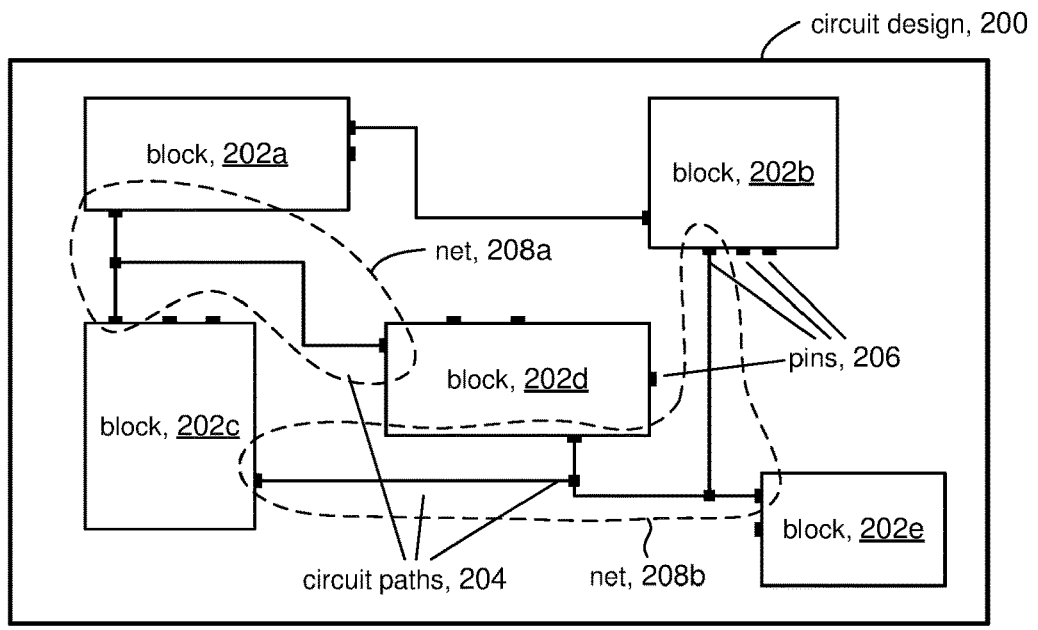
FIG. 2 shows a highly simplified illustration of a circuit design.

FIG. 2 shows an illustrative example of a circuit design to demonstrate a typical routing operation. Circuit design 200 includes circuit blocks 202a-202e, which include objects such as cells (devices, wires, etc.), macros, and the like depending on the level of hierarchy in the design. Blocks 202a-202e can be interconnected by circuit paths 204 between pins (terminals) 206 on the blocks. Pins that are electrically connected together are grouped into nets, for example, nets 208*a*, 208*b*. A netlist contains a list of nets that comprise the circuit design.

The discussion will now turn to the routing aspect of the placement and routing operation 110. The job of routing is to route circuit paths in the circuit design so that pins that belong to the same net are electrically connected together by the routed circuit paths. For example, net 208*a* represents the electrical connection of pins on blocks 202*a* and 202*d*. Net 208*b*, likewise, electrically connect together the pins on blocks 202*c*, 202*d*, and 202*e*. Routing creates a topology that meets design constrains used to assure that various electrical and functional goals are met, such as timing requirements, capacitive coupling constraints, power consumption, among other constraints. With regard to superconducting circuits, superconducting wires in a superconducting circuit behave fundamentally like inductors. Accordingly, restricting inductance effects from flux that is projected from flux sources within the superconducting circuit impose additional constraints.

Figure 3:
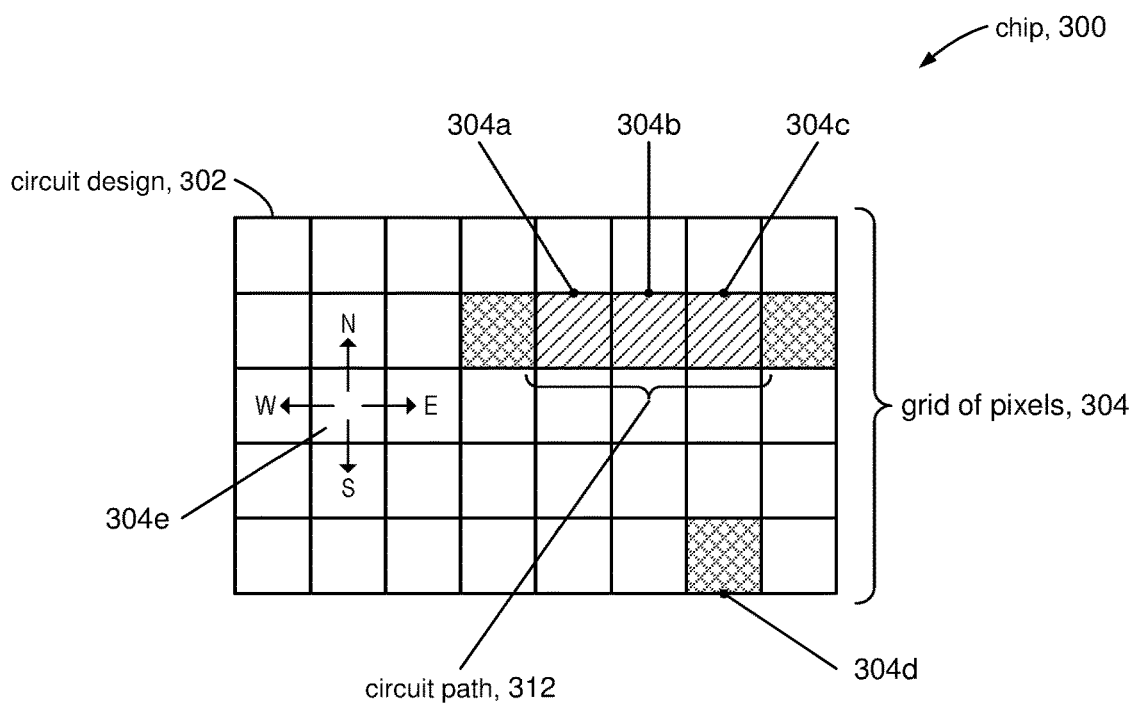
FIG. 3 shows an illustrative chip partitioned into a grid of pixels for routing.

Referring to FIG. 3, IC chip 300, which contains circuit design 302, can be divided into a grid of pixels 304. In a chip that uses multiple metal layers, the grid is a volume of pixels. Pixel locations on the grid can be identified by appropriate grid coordinates. Blocks 202 (FIG. 2) comprising the circuit design are placed relative to the pixels. Likewise, pins 206 of the blocks are defined relative to the pixels. Pixels correspond to grid points on the metal layer where the pins are placed. For example, the cross-hatch shading in pixel 304*d* represents the pin (or a portion of the pin) of a placed block (not shown). Pixels also correspond to the placement of cells comprising a circuit path that connects two pins. For example, the shading in pixels 304*a*, 304*b*, 304*c* cells that comprise circuit path 312 between two pins (cross-hatched). A given pixel 304*e* can have adjacent pixels in the north (N), east (E), south (S), and west (W) compass directions. In the case of multiple metal layers, the given pixel can have adjacent pixels on the adjacent metal layers in the up (U) and down (D) directions.

Figure 4:
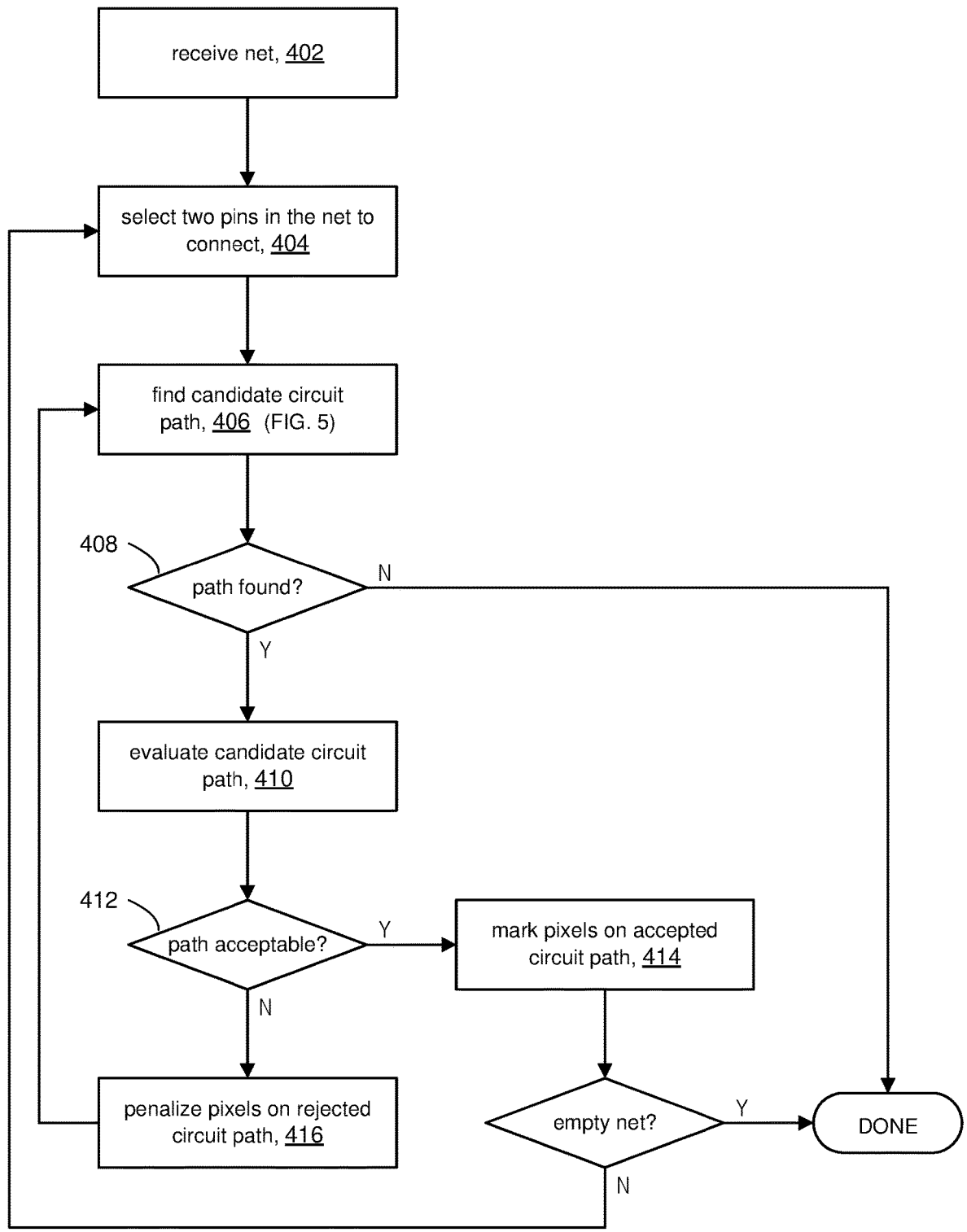
FIG. 4 shows operations for processing a net in accordance with the present disclosure.

Referring to FIG. 4, the discussion will now turn to a high level description of routing circuit paths in a circuit design in accordance with the present disclosure. In some embodiments, for example, computer executable program code, which when executed by a processor (e.g., 1002, FIG. 10) in a computer system (e.g., 1000), can cause the computer system to perform routing in accordance with FIG. 4.

At operation 402, the computer system can receive a net. In some embodiments, for example, the net can be read in from a previously generated netlist. As explained above, a net comprises the set of pins among circuit blocks in the circuit design that are electrically connected. The routing operation determines (finds) circuit paths for each pair of pins in a given net.

At operation 404, the computer system can select two pins in the net to be routed to define a circuit path that connects the two pins. As explained above, the pins are placed relative to a grid of pixels, and as such lie on pixels in the grid. The pixel associated with one pin can be designated the start pixel. The pixel associated with the other pin can be designated the end pixel. Routing attempts to find a circuit path between the start pixel and the end pixel.

At operation 406, the computer system can find a circuit path between the start pixel and the end pixel. Details of this operation are discussed below in connection for FIG. 5. In accordance with the present disclosure, if a circuit path is found, it is assessed to determine whether the path is acceptable. Accordingly, at this point, the circuit path can be deemed to be a candidate circuit path.

At decision point 408, if a candidate circuit path is found in operation 406 then the computer system can proceed to operation 410. If a circuit path is not found, this represents a failure to route this particular path in the net (operation 506, FIG. 5). Further processing of the net can terminate in order to address the failed route; e.g., re-route a previously placed circuit path, redo the placement, etc.

At operation 410, when a candidate circuit path is found, the computer system can evaluate the candidate circuit path to determine if the path is acceptable in terms of one or more constraints on the electrical characteristics of the circuit path. As explained below, geometric and electrical constraints can be described and adhered to during routing. However, there can be constraints that require excessive computational effort and thus may not be practical to assess during routing. Other constraints cannot be computed until the route is fully computed. For example, superconducting wires need to serve as an inductor with narrow target inductance ranges. These inductance characteristics cannot be assessed until after the circuit path has been routed.

At decision point 412, if the candidate circuit path is acceptable then the computer system can proceed to operation 414. If the candidate circuit path is not acceptable (rejected) then the computer system can proceed to operation 416 to penalize the pixels comprising the candidate circuit path. In accordance with the present disclosure, pixels in the grid are associated with respective penalty values. In some embodiments, for example, the penalty value can be a positive integer value. A pixel that has not been penalized can have a penalty value of '0'. When a pixel is penalized, its penalty value can be incremented. In accordance with the present disclosure, pixels can be assigned to multiple candidate circuit paths during the routing process. A pixel can be penalized each time it is on a candidate circuit path that is rejected. A pixel with a higher-valued penalty value means the pixel has been penalized more than a pixel with a lower penalty value. As will be discussed below, the penalty value can be used to select pixels when routing a circuit path between the start and end pixels.

At operation 414, when the candidate circuit path is deemed acceptable, the computer system can mark the pixels on the accepted circuit path as being on or otherwise belonging to a circuit path. As will be explained below in connection with FIG. 5, such pixels can be deemed "hard obstructions" for the purpose of routing. It is noted that hard obstructions can be other things in the circuit such as gates, anything that we have to avoid during routing, in addition to previously routed wires. Processing can return to operation 404 to select the next pair of pins in the net and route a circuit path between the selected pair of pins. If all circuit paths in the net have been routed (an empty net), processing can be deemed complete.

At operation 416, when the candidate circuit path is deemed not acceptable (the path is rejected), the computer system can penalize the pixels on the rejected circuit path. In some embodiments, for example, the computer system can increment the penalty value of each pixel in the set of pixels comprising the rejected circuit path. Processing can return to operation 406 to determine another candidate circuit path between the start and end pixels.

Figure 5:
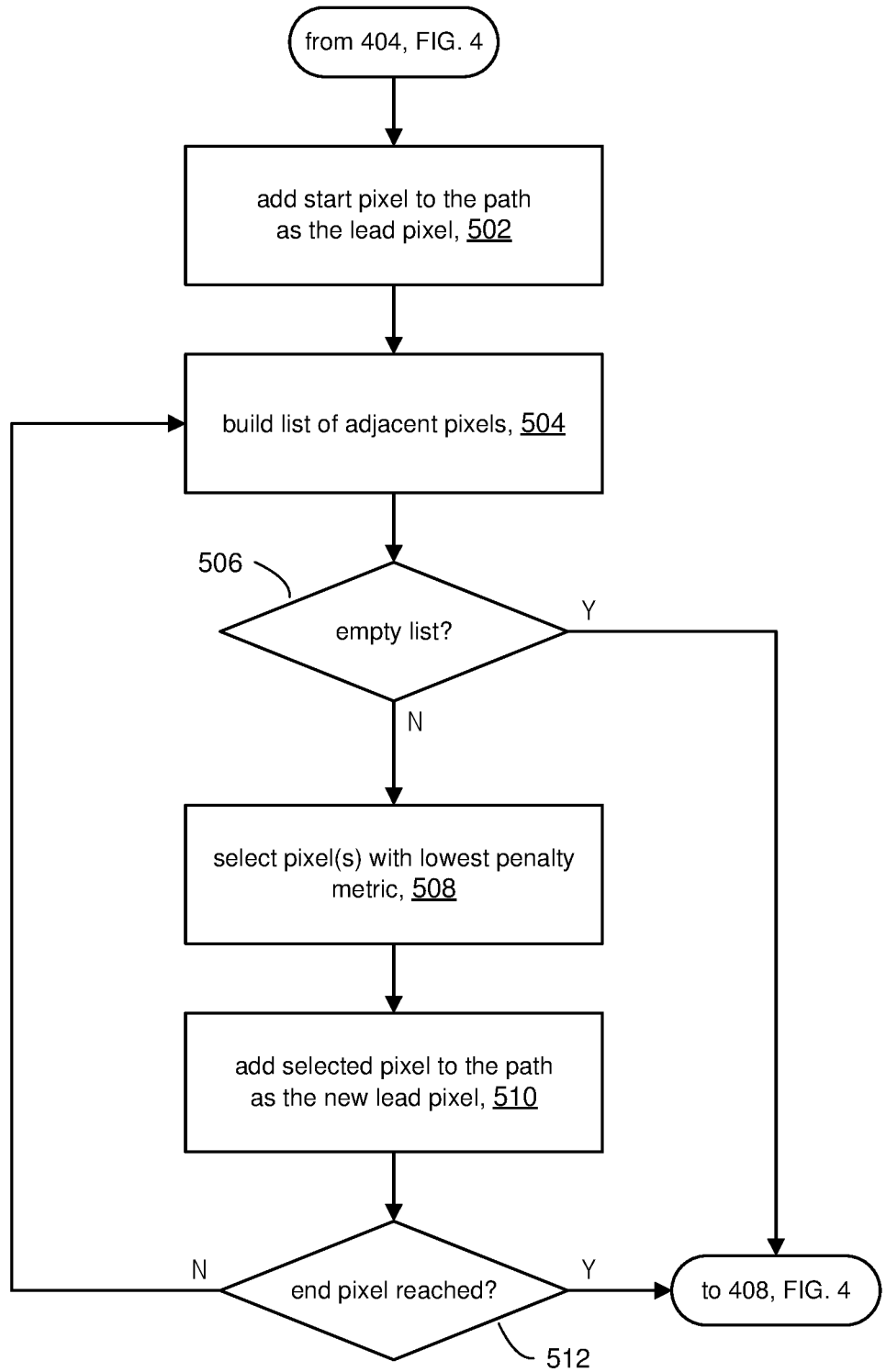
FIG. 5 shows operations for routing in accordance with the present disclosure.

Referring to FIG. 5, the discussion will now turn to a high level description of routing a circuit path in accordance with the present disclosure. In some embodiments, for example, computer executable program code, which when executed by a processor (e.g., 1002, FIG. 10) in a computer system (e.g., 1000), can cause the computer system to perform routing in accordance with FIG. 5.

At operation 502, the computer system can add the start pixel from operation 404 in FIG. 4 as the first on the circuit path. In some embodiments, for example, the start pixel can be stored in a table that represents the set of pixels comprising the path. The start pixel serves as the first lead pixel on the circuit path. As the name implies, a lead pixel represents the front of the circuit path, leading a path toward the end pixel. The routing process determines the circuit path iteratively, identifying pixels on the path one pixel at a time. In a given iteration, a pixel is identified with respect to the lead pixel. When a pixel is identified, that pixel becomes the lead pixel for the next iteration.

At operation 504, the computer system can build or otherwise obtain a list of pixels that are adjacent to the lead pixel to begin the process of identifying the next pixel on the circuit path. The adjacent pixels represent candidates for selection as the next pixel on the circuit path. Referring to FIG. 3, adjacent pixels are those pixels in the compass directions relative to the lead pixel. In a multi-metal layer design, adjacent pixels also include pixels in the adjacent metal layers in the Up and Down directions. The list of adjacent pixels can exclude pixels that are marked or otherwise deemed to be hard obstructions. A pixel can be deemed to be a hard obstruction if the pixel is already associated with a circuit object. A circuit object can be a piece of a previously placed circuit path (e.g., operation 412, FIG. 4), a pin, part of a placed device (e.g., a gate), etc.

At decision point 506, if the list of adjacent pixels is empty this means that there are no candidate pixels adjacent to the lead pixel; e.g., all adjacent pixels are designated as hard obstructions, all adjacent pixels are part of the wire being routed, there are no pixels because the route has led to the edge of the circuit, and so on. Routing of the circuit path cannot continue. Routing has failed and the computer system can terminate routing this particular circuit path. Processing can return to operation 408 with a code that indicates a path has not been found. If the list of adjacent pixels is not empty, there are candidate pixels to continue with routing; the computer system can proceed to operation 508.

At operation 508, the computer system can select an adjacent pixel from the list that has the lowest penalty value as a candidate for the next lead pixel in the path. In the case where two or more adjacent pixels have the same lowest penalty value, additional tie-breaking criteria can be used to select from those pixels. For example, a criterion can be to choose the pixel that is closest to the end pixel. Another criterion can be to choose the pixel based on an electrical characteristic; for example, lowest computed inductance. Criteria can be considered in sequence until a the tie is broken, in combination, and so on.

At operation 510, the computer system can add the selected pixel to the set of pixels comprising the circuit path, thus extending the path. The selected pixel can now be deemed the new lead pixel on the path for the next iteration.

At decision point 512, if the selected pixel is the end pixel, then the computer system has completed routing this particular circuit path. Processing can return to operation 408 with a code that indicates a circuit path has been found. If the selected pixel is not the same as the end pixel, then the computer system can return to operation 504 to select the next pixel based on the new lead pixel.

FIGS. 6A-6D, 7A-7E, 8A-8B, and 9A-9B show sequences for routing a circuit path to illustrate various aspects of the operations in FIGS. 4 and 5. References to FIGS. 4 and 5 are made in parentheses. FIGS. 6A-6D, 7A-7E, 8A-8B, and 9A-9B show a simple circuit design on IC chip 600. The chip is represented as a grid of pixels 602. Coordinates have been added for convenience to reference pixels on the grid.

Figure 6A:
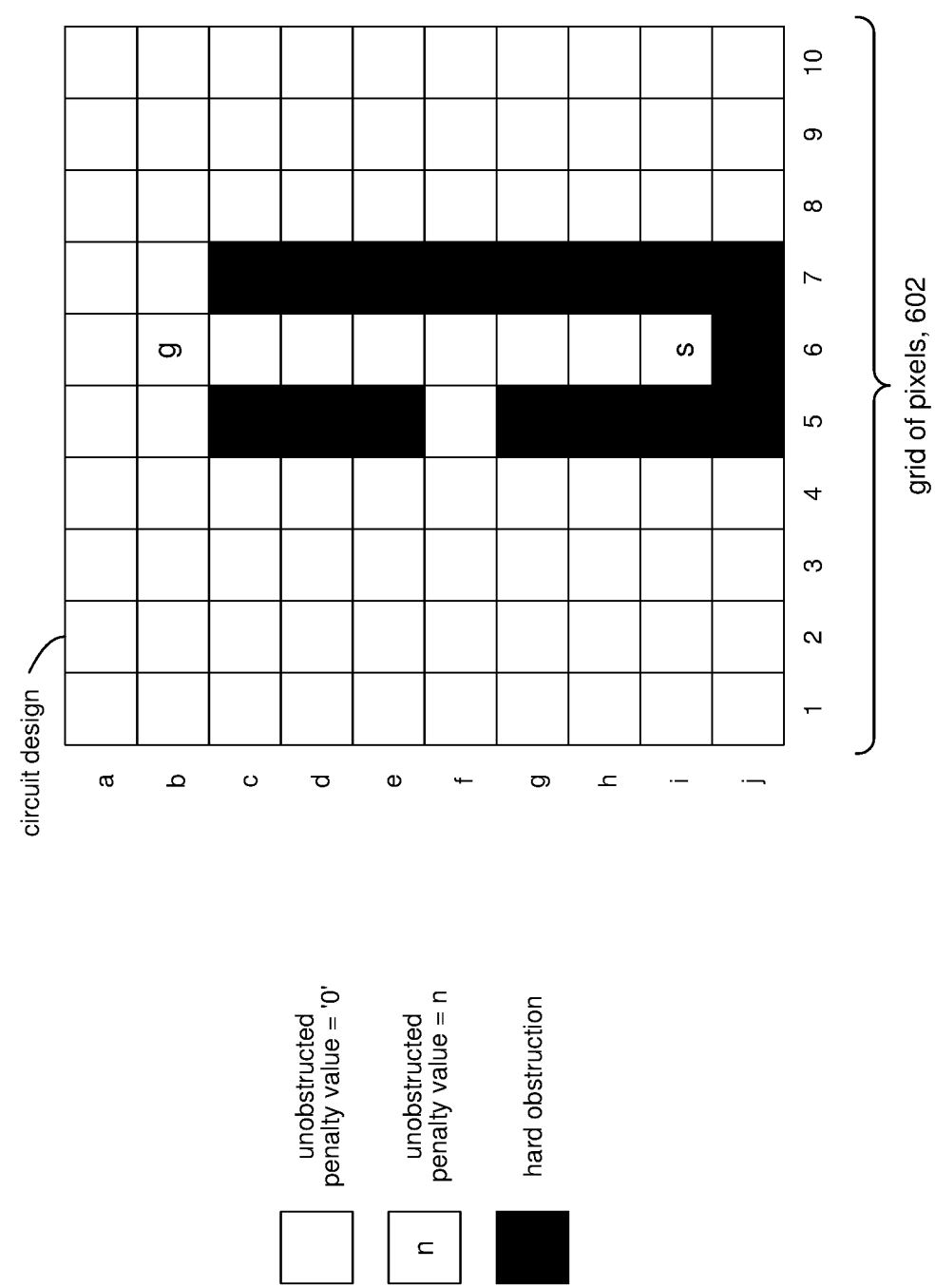
FIGS. 6A, 6B, 6C, 6D illustrate an example of a routing sequence in accordance with aspects of the present disclosure.

The sequence in FIGS. 6A-6D illustrate routing an initial circuit path. FIG. 6A shows an initial configuration of the grid with hard obstructions represented by the filled pixels. The start pixel is pixel [h, 6] and is identified as 's' and the end pixel is pixel [b, 6] and is identified as 'g'. We can assume without loss of generality that all pixels at this time have not been penalized; for example, their respective penalty values are '0'.

FIG. 6A illustrates routing a circuit path from 's' to 'g'. The routing process begins with setting the start pixel at [i, 6] to be the initial lead pixel, (operation 502), creating the set of pixels comprising the circuit path, which initially contains:
[i, 6].

Figure 6B:
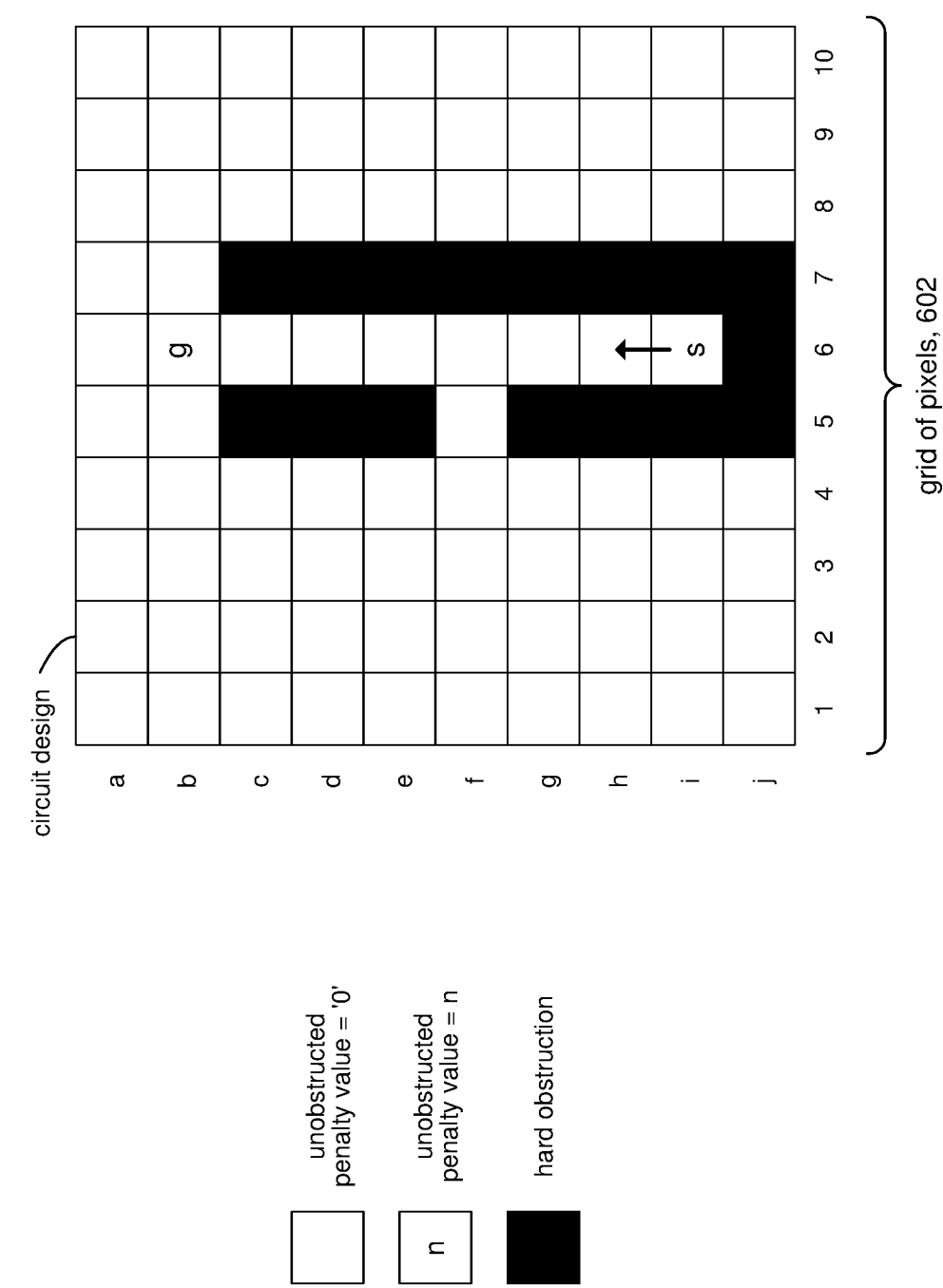

Referring to FIG. 6B, there is only one candidate pixel that is adjacent to lead pixel [i, 6], namely pixel [h, 6]. The candidate is selected as the new lead pixel (operation 510) and added to the set of pixels comprising the circuit path. After the first pass of the loop in FIG. 5, the set of pixels of the partially routed circuit path contains:
[i, 6], [h, 6].

Figure 6C:
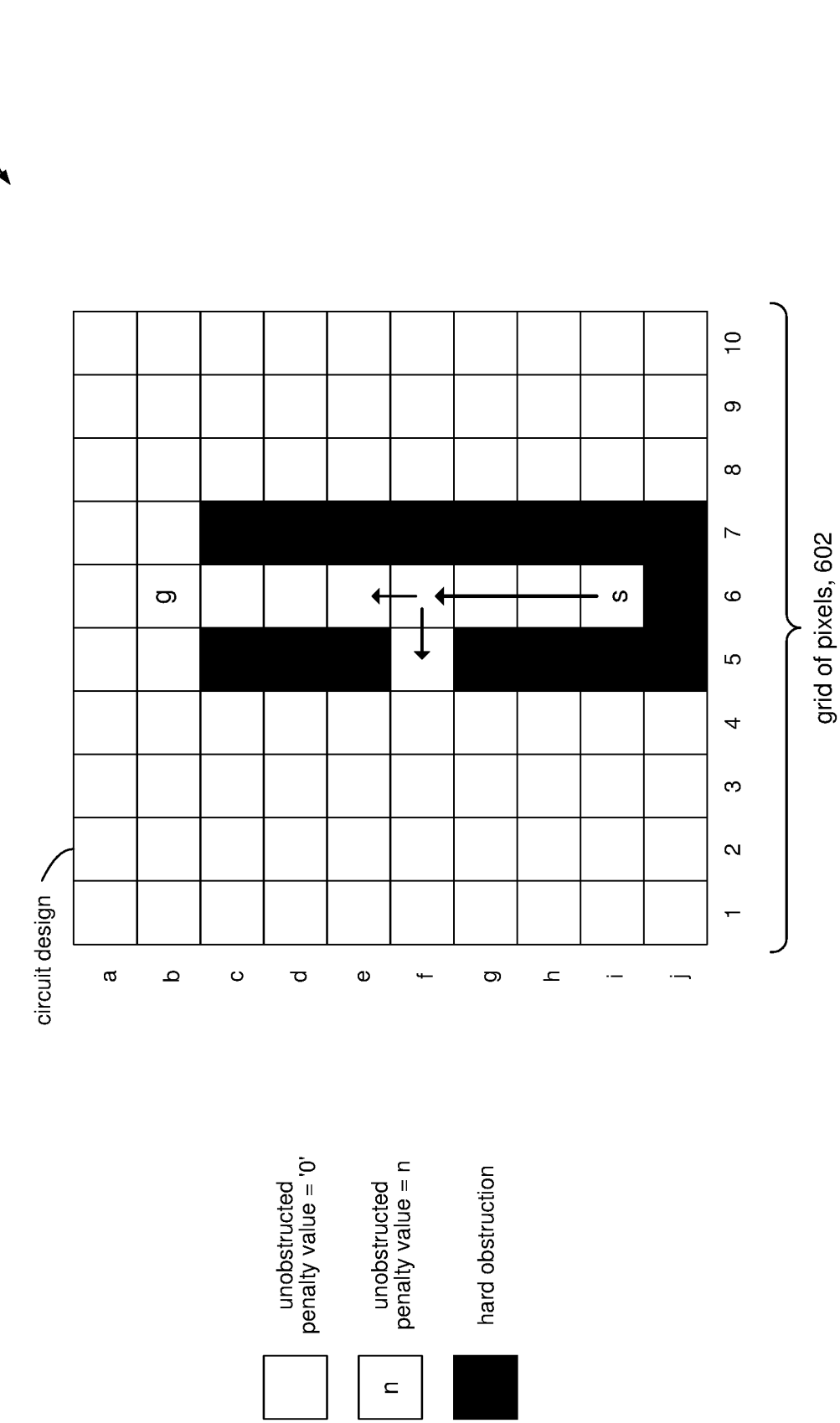

Referring to FIG. 6C, where the lead pixel is [h, 6], again, there is only one candidate pixel that is adjacent to the lead pixel, namely pixel [g, 6]. The candidate pixel is selected as the new lead pixel (operation 510) and added to the set of pixels during the second pass through FIG. 5. After a third pass, we can see that the set of pixels contains:
[i, 6], [h, 6], [g, 6], [f, 6].

Now, with [f, 6] as the lead pixel, there are two candidate pixels that are adjacent to [f, 6], namely north-direction pixel [e, 6] and east-direction pixel [f, 5], (operation 504). Both pixels are tied with same smallest penalty value, namely '0'. Suppose for the sake of discussion the tie breaker is based on the pixel that is closest to the end pixel at [b, 6]. Accordingly, pixel [e, 6] is selected over [f, 5] because [f, 5] is further away from the end pixel, (operation 508). Pixel [e, 6] becomes the new lead pixel and is added to the set of pixels. The partially routed circuit path contains:
[i, 6], [h, 6], [g, 6], [f, 6], [e, 6].

Figure 6D:
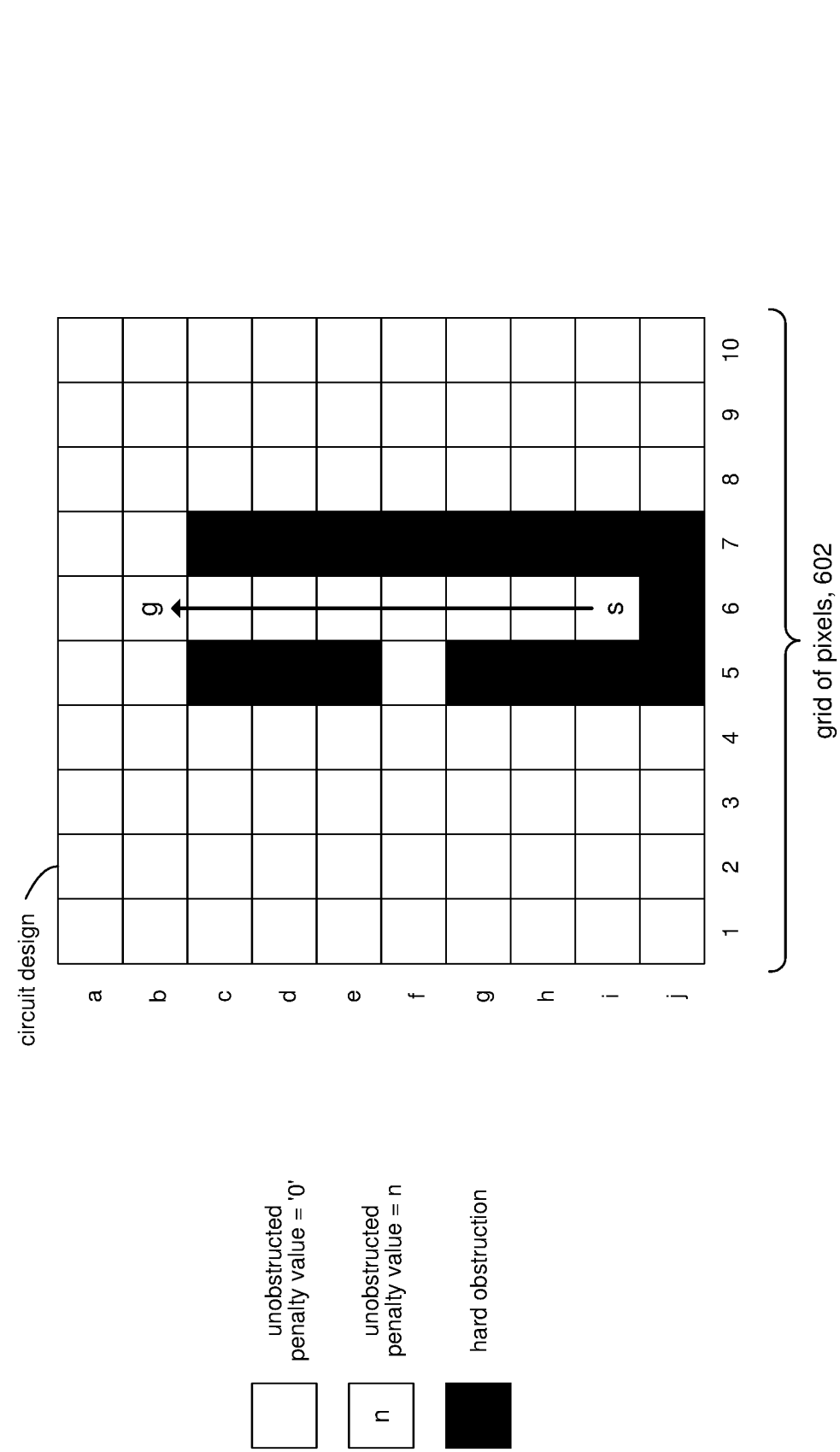

Referring to FIG. 6D, pixels [d, 6] and [c, 6] are then added to the set of pixels. When pixel [c, 6] is added and becomes the lead pixel, the next selected pixel will be [b, 6]. The routing process can terminate because the selected pixel is the same as the end pixel, (decision point 512). The fully routed circuit path comprises the set of pixels:
[i, 6], [h, 6], [g, 6], [f, 6], [e, 6], [d, 6], [c, 6], [b, 6].

Referring to the sequence in FIGS. 7A-7D, and continuing with our routing example, suppose for discussion purposes that the routed circuit path shown in FIG. 6D is deemed unacceptable and hence rejected, (decision point 412). For example, the routed circuit path may not meet an inductance constraint and becomes rejected.

Figure 7A:
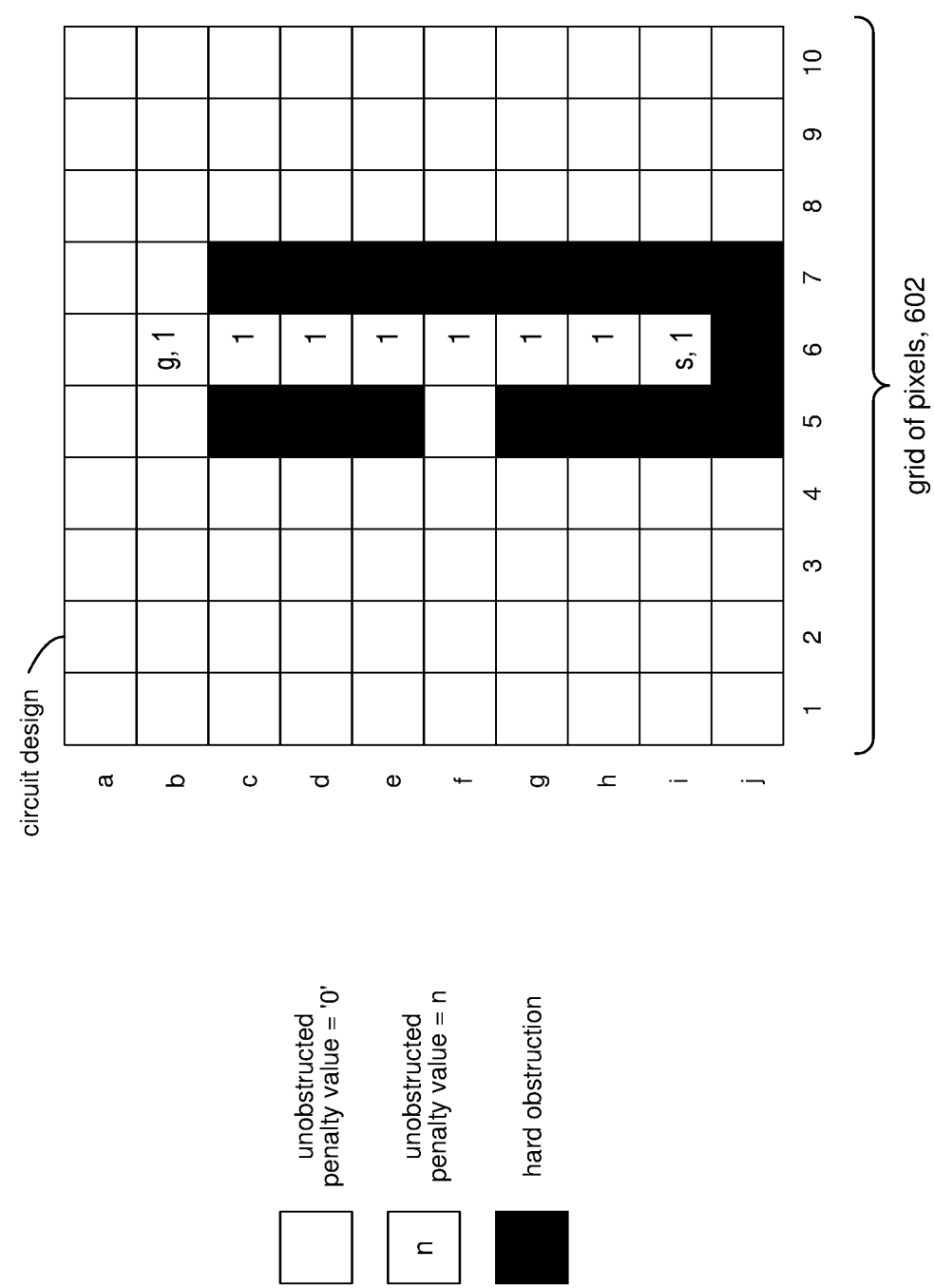
FIGS. 7A, 7B, 7C, 7D, 7E illustrate an example of a routing sequence that continues from FIG. 6D in accordance with aspects of the present disclosure.

FIG. 7A shows that the pixels on the rejected circuit path can be penalized, (operation 416). In accordance with the present disclosure, each pixel in the set of pixels comprising the rejected circuit path:
[i, 6], [h, 6], [g, 6], [f, 6], [e, 6], [d, 6], [c, 6], [b, 6].
can be penalized by incrementing their respective penalty values, which as noted above, are initially at '0'. FIG. 7A shows the penalized pixels having a penalty value of '1'.

Figure 7B:
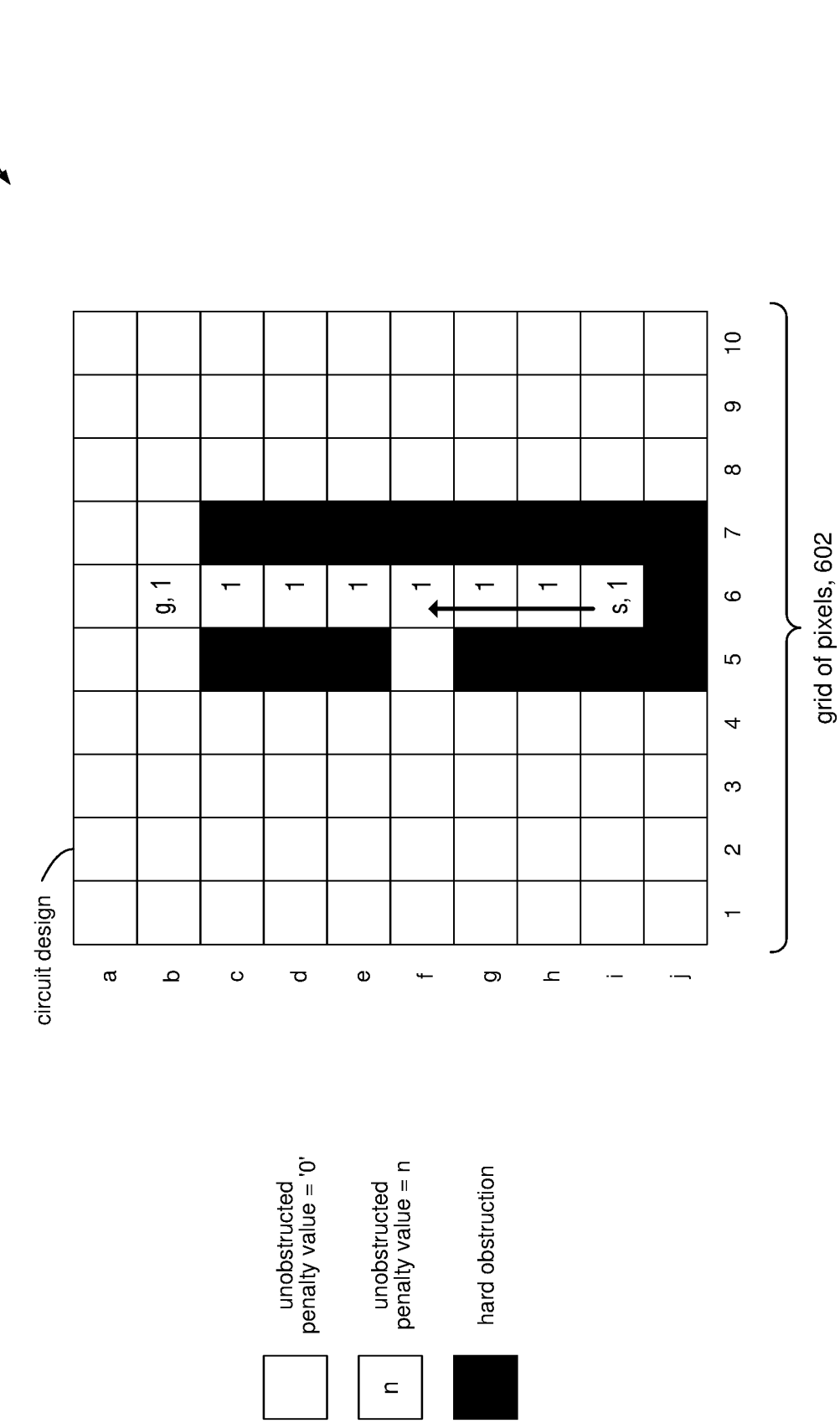

FIG. 7B illustrates routing another circuit path from 's' to 'g' in the presence of the penalized pixels, (operation 406). The routing process begins with setting the start pixel [i, 6]

as the initial lead pixel to create the set of pixels comprising the circuit path, which initially contains:

[i, 6].

Pixels [h, 6], [g, 6], and [f, 6] are then selected and added to the set of pixels for the same reason they were selected in FIG. 6A despite that they having a penalty value of '1'. More significantly, in accordance with the present disclosure, these pixels [h, 6], [g, 6], and [f, 6] are allowed to be selected in the first place, despite them having been on a rejected circuit path. FIG. 7B shows the partially routed circuit path from 's' to the lead pixel [f, 6].

Figure 7C:
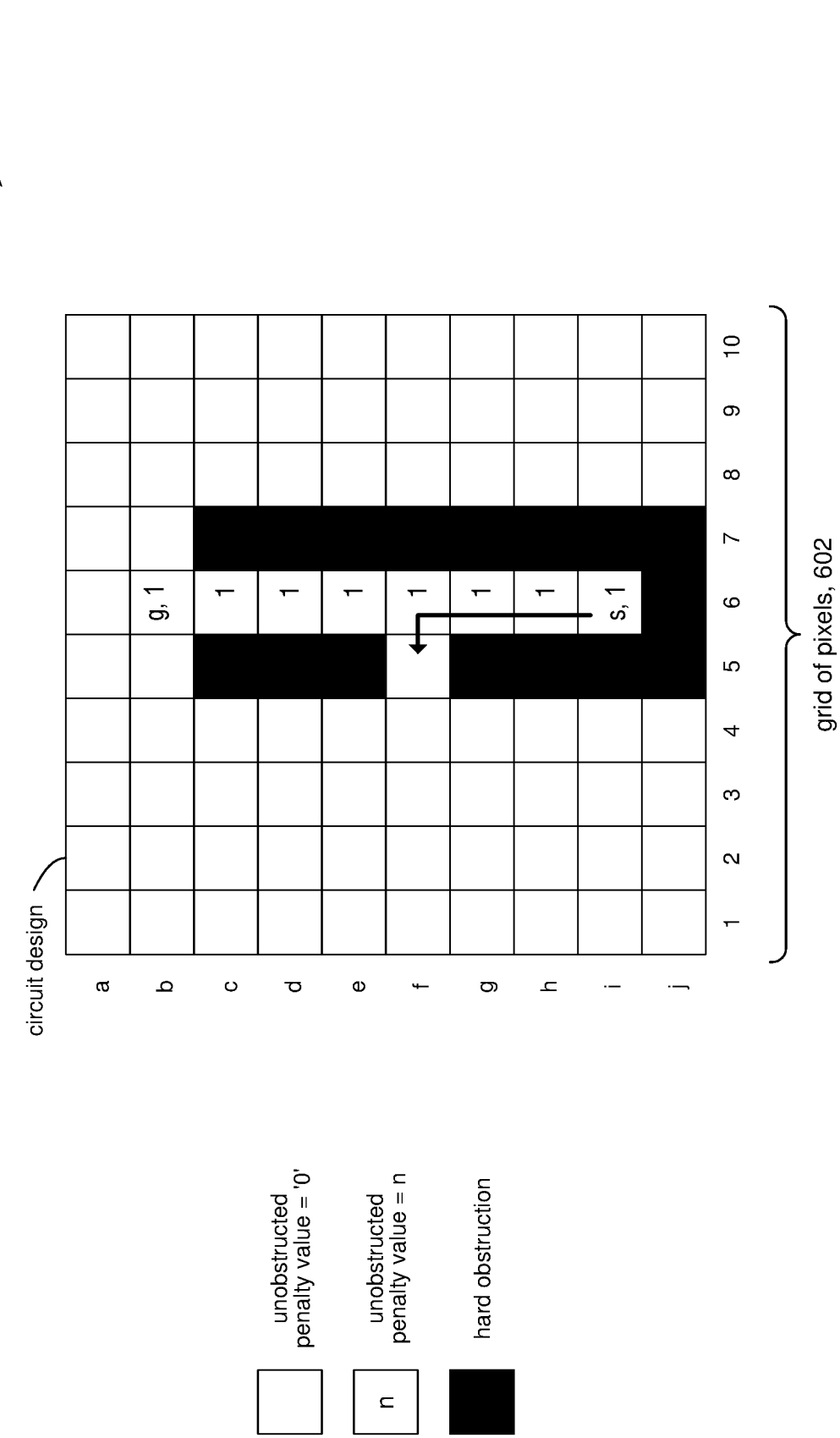

FIG. 7C continues the routing with [f, 6] as the lead pixel. There are two pixels that are adjacent to [f, 6], namely pixel [e, 6] and pixel [f, 5]. Candidate pixel [e, 6] has a higher penalty value than candidate pixel [f, 5]. Accordingly, pixel [f, 5] is selected over [e, 6] despite [f, 5] being further away from the end pixel, (operation 508). Pixel [f, 5] becomes the new lead pixel and is added to the set of pixels:

[i, 6], [h, 6], [g, 6], [f, 6], [f, 5].

Figure 7D:
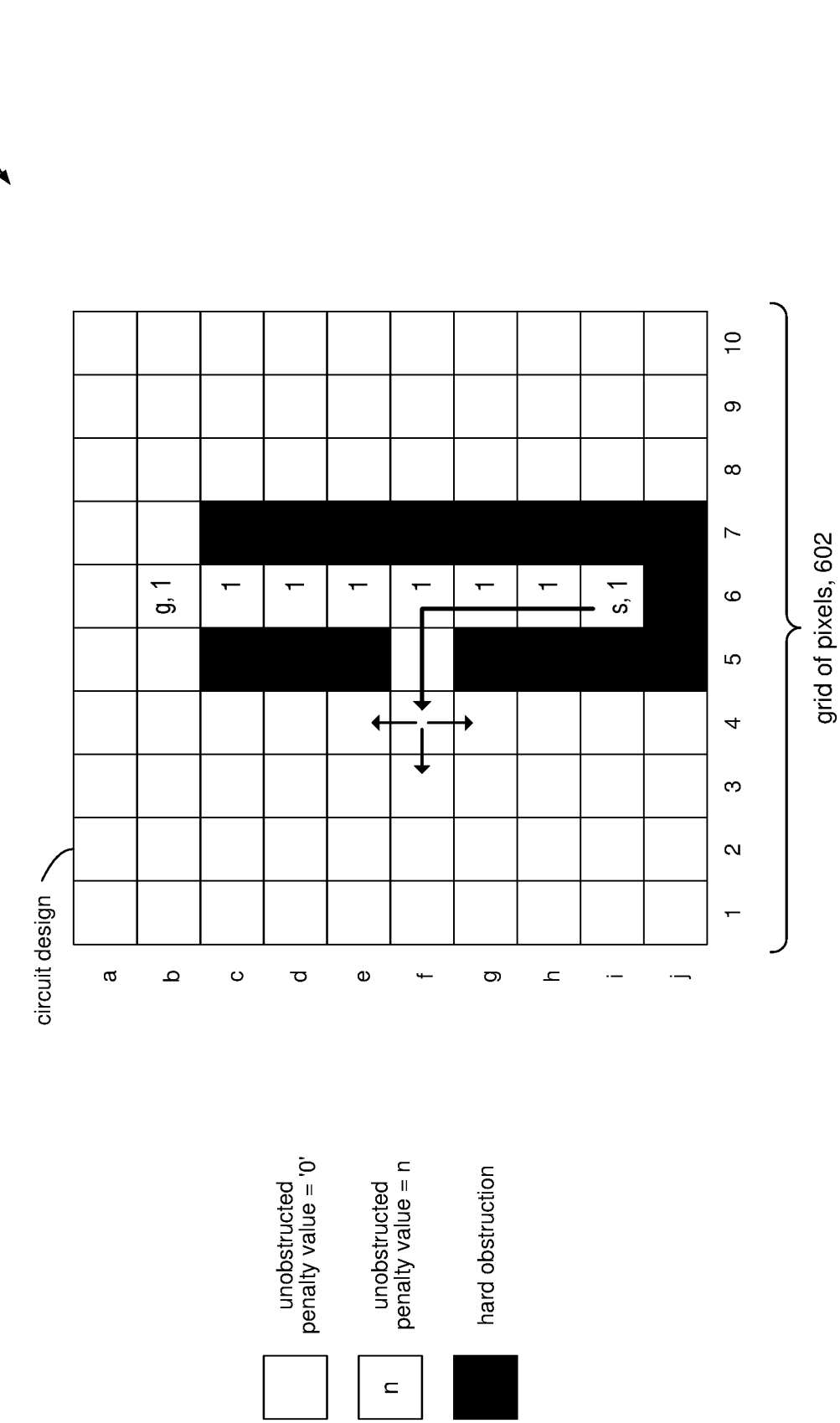

FIG. 7D shows the routing advances to pixel [f, 4],

[i, 6], [h, 6], [g, 6], [f, 6], [f, 5], [f, 4]

where [f, 4] is the lead pixel and pixels adjacent to [f, 4] include pixels [e, 4] (north), [g, 4] (south), and [f, 3] (west). Given that these pixels have the same smallest penalty value, namely '0', the tie breaker can be based on the pixel that is closest to the end pixel at [b, 6]. Accordingly, pixel [e, 4] is selected (operation 508) and becomes the new lead pixel that is added to the set of pixels:

[i, 6], [h, 6], [g, 6], [f, 6], [f, 5], [f, 4], [e, 4].

Figure 7E:
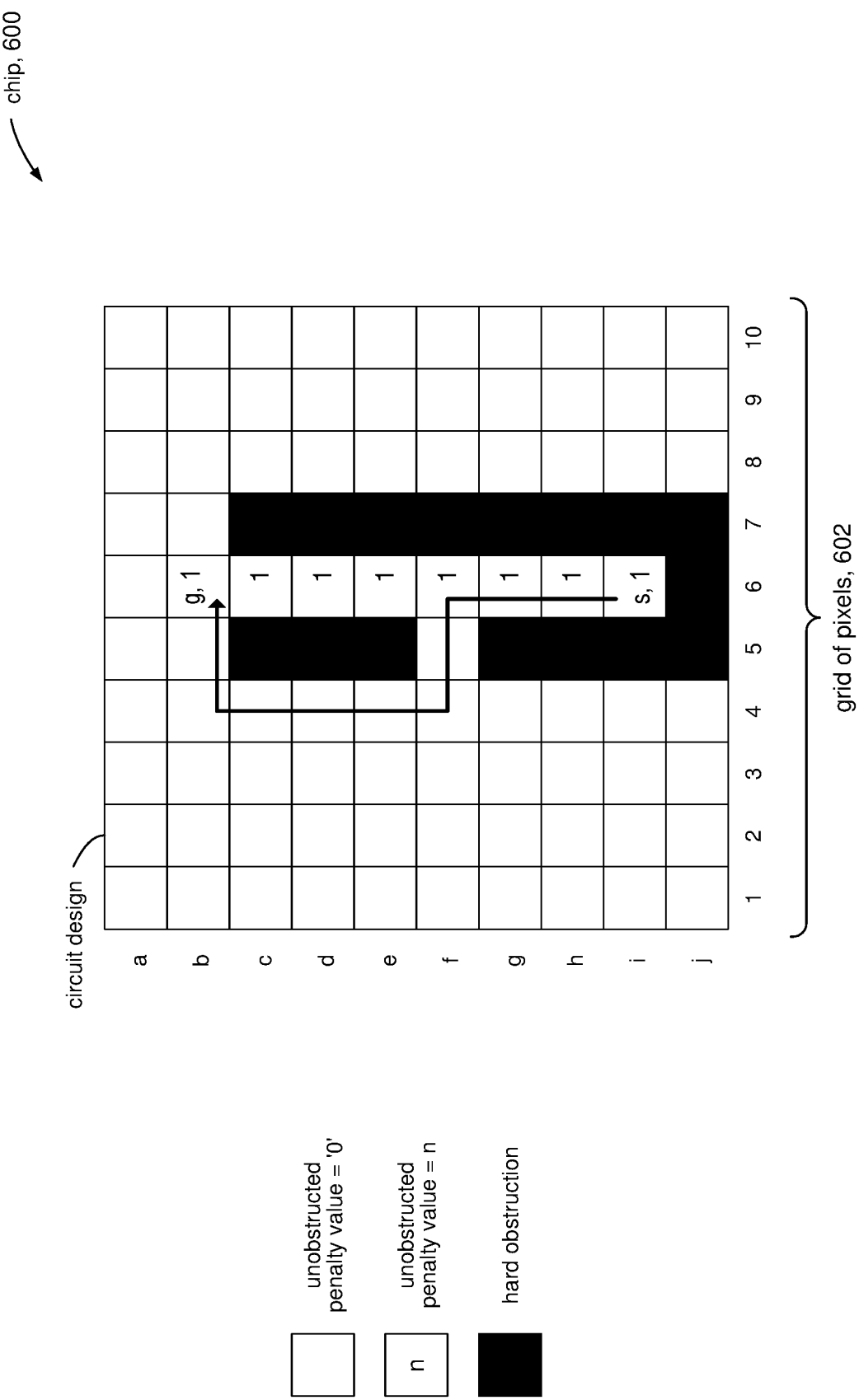

FIG. 7E shows the fully routed circuit path comprising the set of pixels:

[i, 6], [h, 6], [g, 6], [f, 6], [f, 5], [f, 4], [e, 4], [d, 4], [c, 4], [b, 4], [b, 5], b, 6].

Figure 8A:
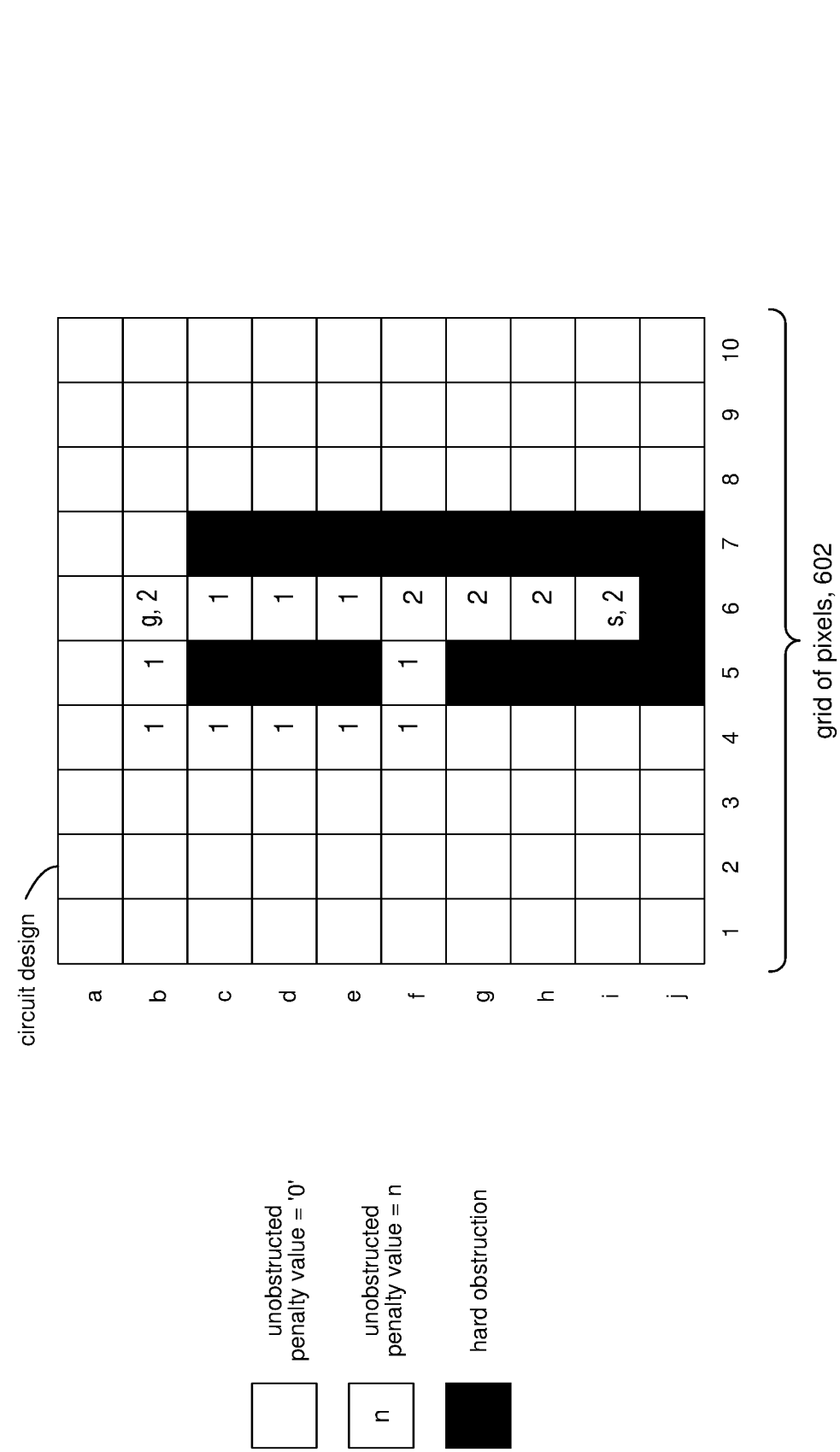
FIGS. 8A, 8B illustrate an example of a routing sequence that continues from FIG. 7E in accordance with aspects of the present disclosure.
Figure 8B:
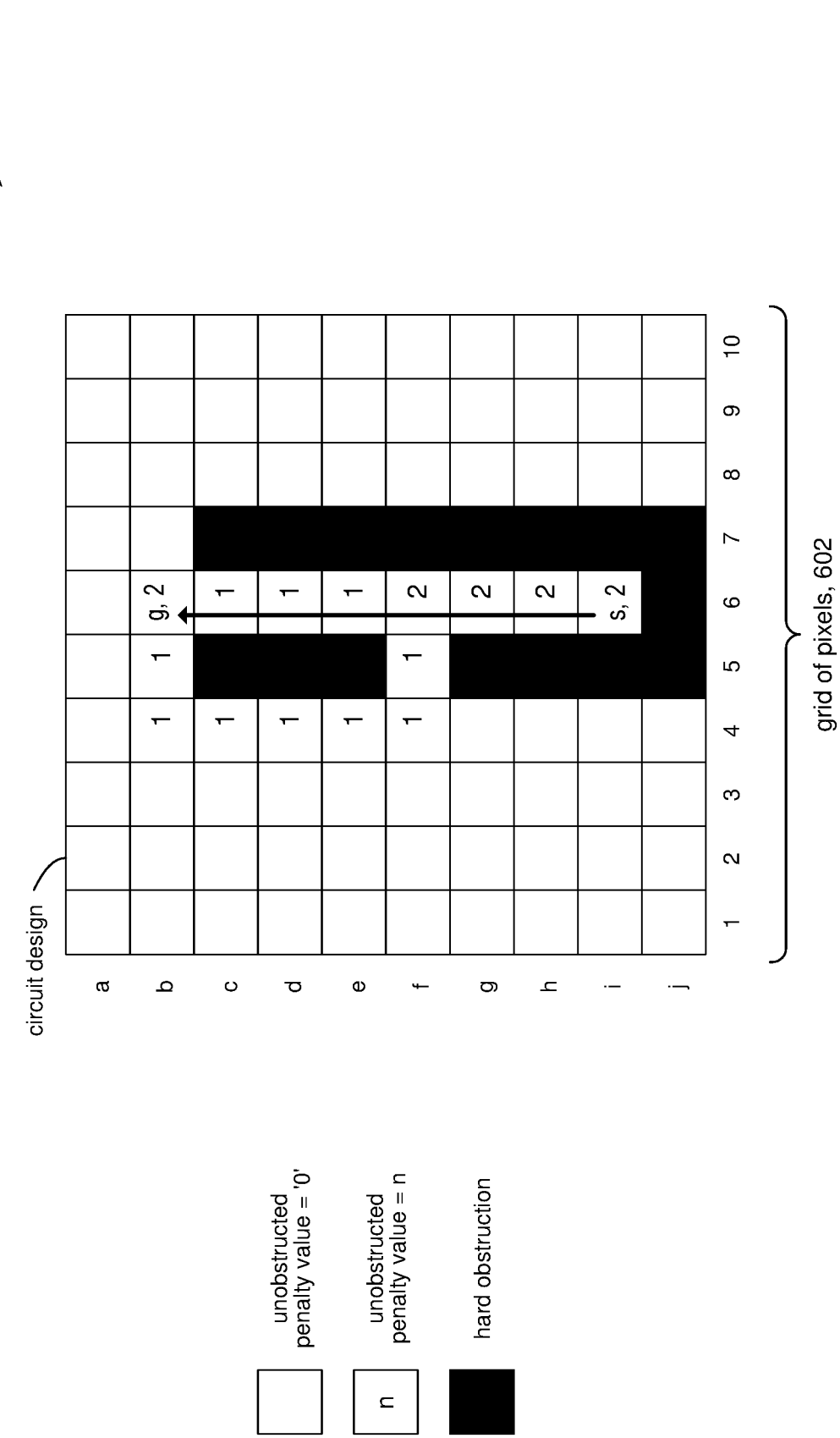

Referring to FIGS. 8A and 8B, and continuing with our routing example, suppose that the routed circuit path shown in FIG. 7E is deemed unacceptable (rejected) and another circuit path is routed. FIG. 8A shows that each pixel in the set of pixels comprising the rejected circuit path is penalized by incrementing their respective penalty values:

[i, 6], [h, 6], [g, 6], [f, 6], [f, 5], [f, 4], [e, 4], [d, 4], [c, 4], [b, 4], [b, 5], [b, 6], where some pixels have a penalty value of '2', indicating they have been penalized twice.

FIG. 8B shows the outcome of routing a circuit path based on the configuration shown in FIG. 8A. It can be seen that the newly routed circuit path is the same as the previously rejected circuit path shown in FIG. 6D, namely:

[i, 6], [h, 6], [g, 6], [f, 6], [e, 6], [d, 6], [c, 6], [b, 6].

The circuit path in FIG. 8B is obtained because when the routing process reaches pixel [f, 6] as the lead pixel, the choices for the next pixel are [f, 5] and [e, 6]. Both pixels have the same penalty value, '1', and given that the tie breaker is based on the pixel that is closest to the end pixel, then pixel [e, 6] is chosen because it is closer to the end pixel at [b, 6], thus resulting in the same circuit path as shown in FIG. 6D. Given that the path in FIG. 6D was rejected, the path shown in FIG. 8B will also be rejected.

Figure 9A:
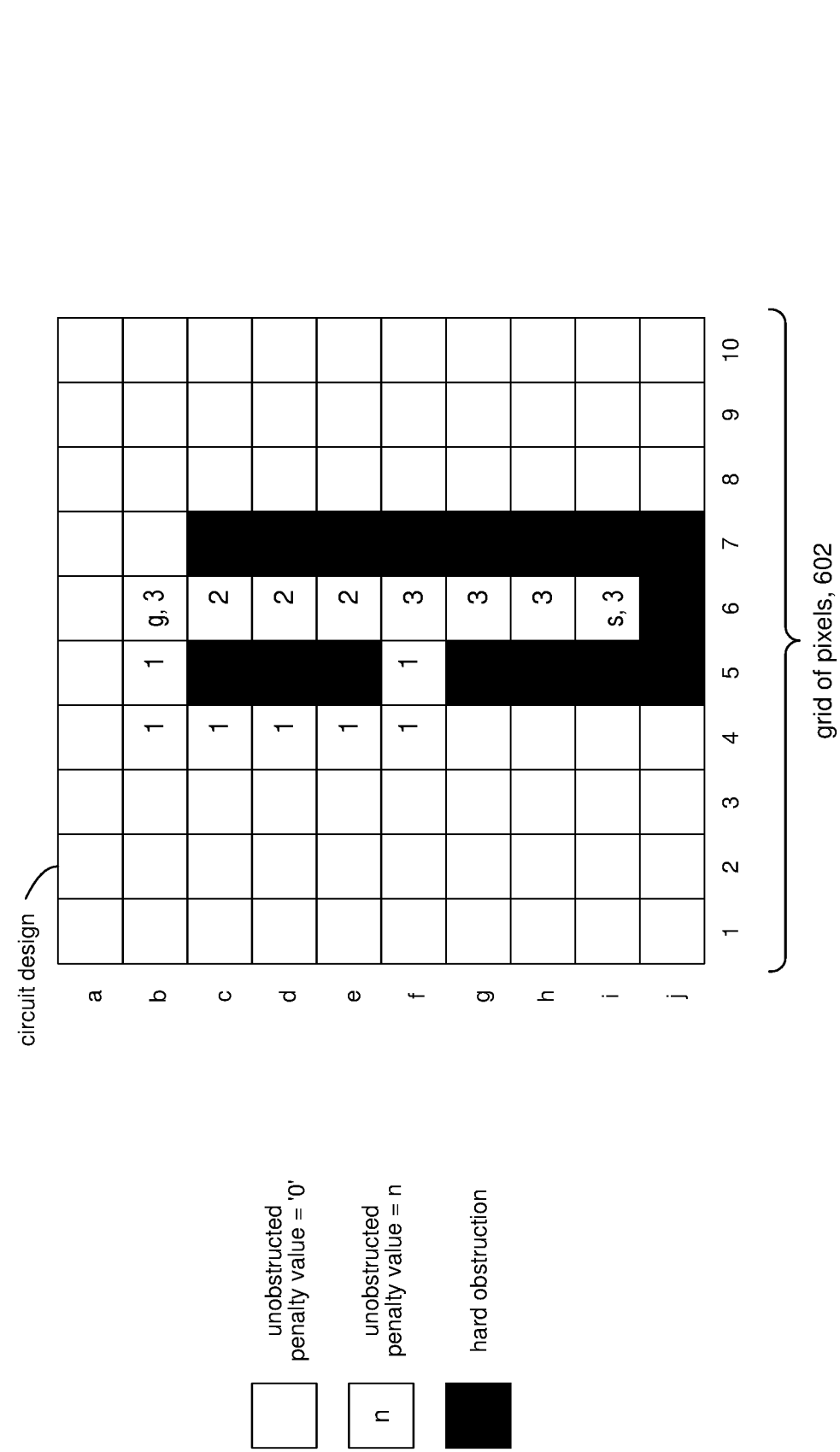
FIGS. 9A, 9B illustrate an example of a routing sequence that continues from FIG. 8B in accordance with aspects of the present disclosure.
Figure 9B:
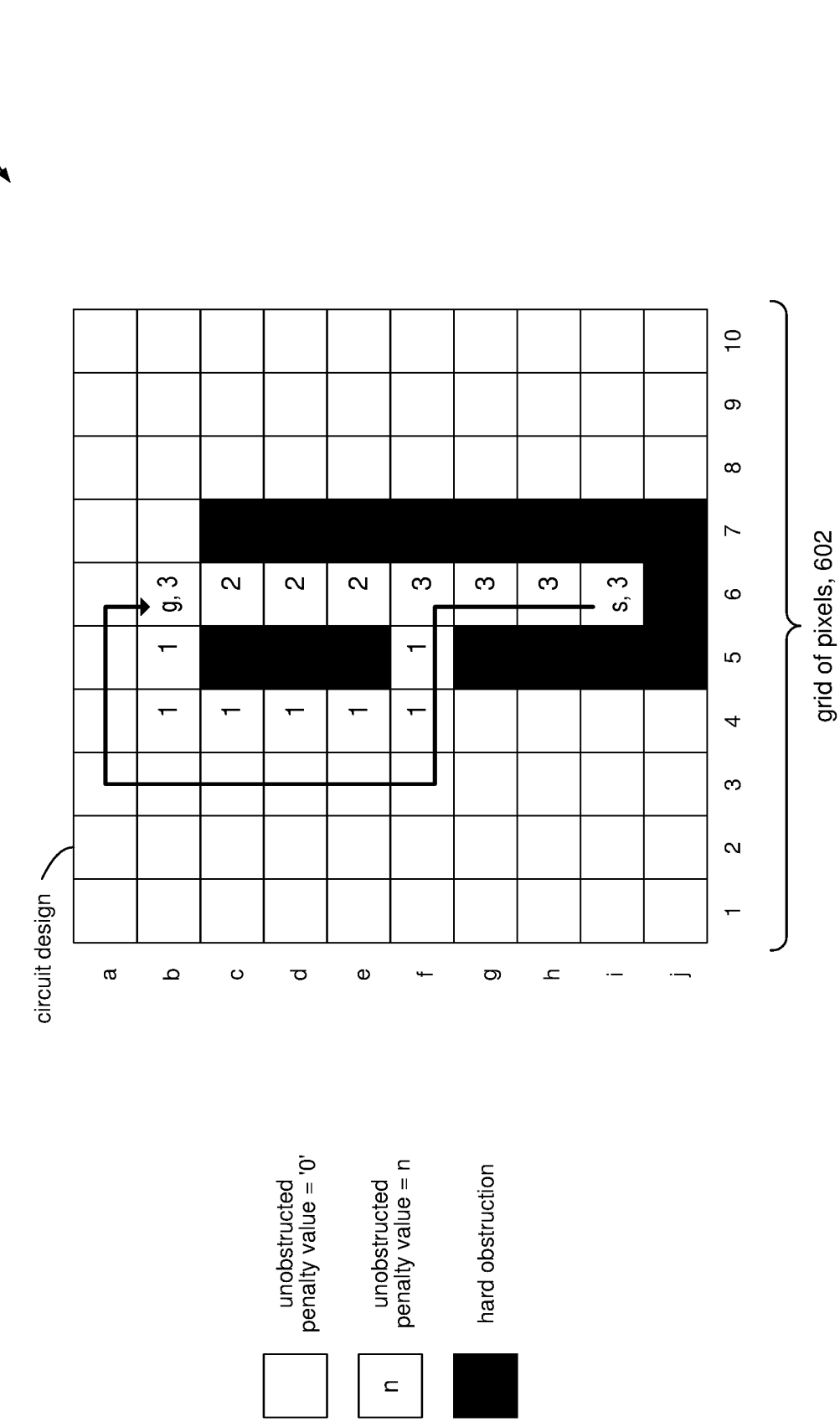

Referring to FIGS. 9A and 9B, and continuing with our routing example, since the routed circuit path shown in FIG. 8B is rejected, then yet another circuit path is routed. FIG. 9A shows the penalty values after penalizing the routed circuit path shown in FIG. 8B.

FIG. 9B shows the fully routed circuit path. Although the routing solution is self-explanatory, a point of interest worth noting is when the routing process reaches pixel [e, 3] as the lead pixel. The list of candidate pixels for lead pixel [e, 3] includes pixels [d, 3], [e, 4], and [e, 2]. Only pixels [d, 3] and [e, 2] are considered for selection because they have the lowest penalty value ('0') of the three candidates; or stated differently pixel [e, 4] is excluded because it has the highest penalty value among the candidates. The selected pixel is [d, 3], given that the tie breaker is based on the pixel that is closest to the end pixel of [b, 6].

It can be appreciated from the above examples, that the use of penalty values allows pixels that are on a rejected path to remain as candidates for consideration when re-routing a circuit path to find an alternate to the rejected circuit path. By comparison, conventional routing algorithms eliminate from consideration pixels on a rejected path. In some situations, this restriction on pixels can result in one or more un-routable circuit paths that requires ripping up previously routed paths or previously placed devices, thus significantly increasing design turnaround times.

FIG. 6D, for example, shows that with conventional routing algorithms if the routed path is rejected, the set of pixels comprising the path would be eliminated from consideration for re-routing purposes. As a result, a circuit path between 's' and 'g' would not be possible. The circuit design would have to be re-worked and circuit paths re-routed. However, as can be seen in FIG. 7C, rather than eliminating those pixels, routing in accordance with the present disclosure allows the pixels to be re-used, but with a penalty value so that they are less desirable (softly discouraged) as compared to non-penalized or lesser penalized pixels. FIG. 7C shows that at pixel [f, 6] a choice exists, choose pixel [e, 6] or pixel [f, 5]. The respective penalty values of the pixels bias the choice toward [f, 5], allowing the circuit path to be routed as shown in FIG. 7E.

Routing in accordance with the present disclosure can significantly reduce the routing process because the use of penalty value allows for more alternate paths to considered than without the use of penalty values. Rather than preventing all pixels on a rejected path to be searched, the present disclosure allows some of those pixels to be considered to find a route when, otherwise, no other routes can be found.

Figure 10:
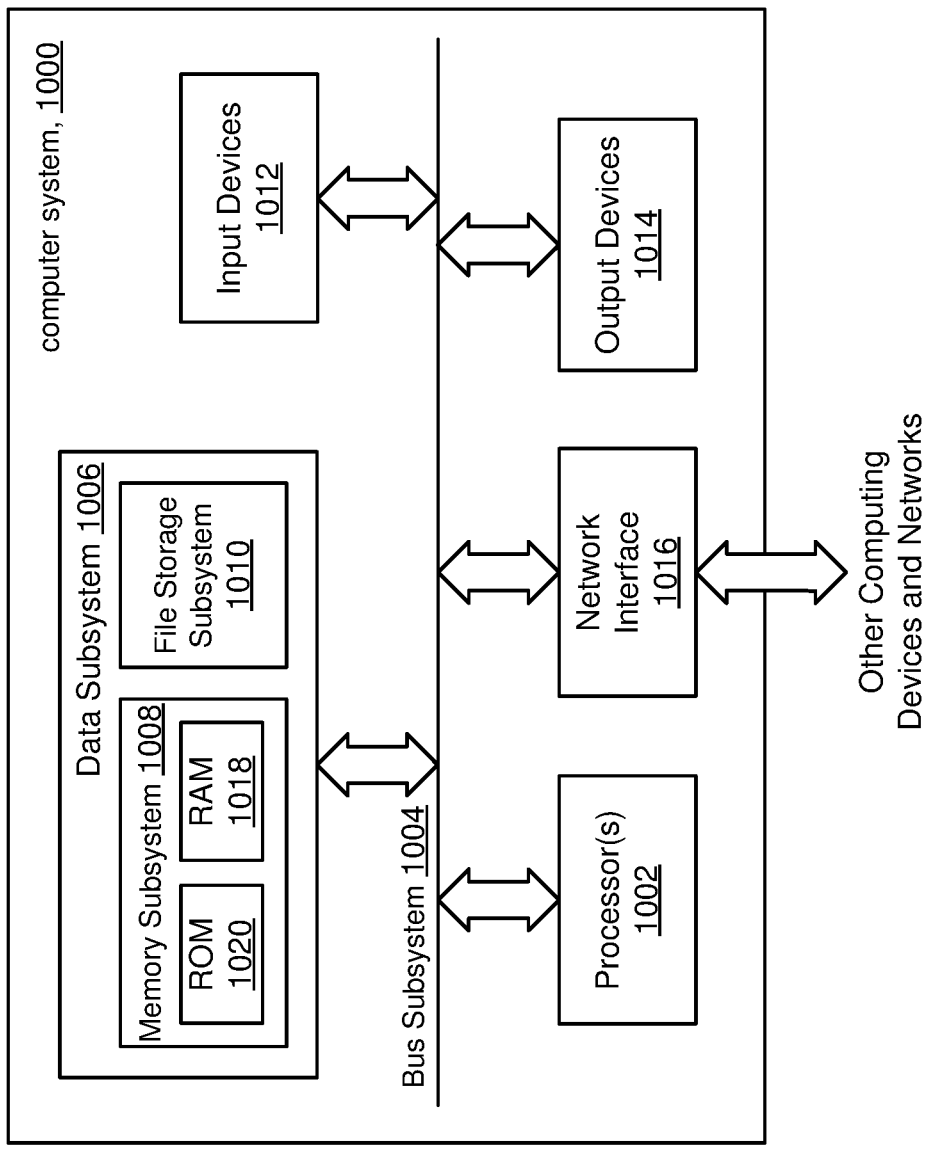
FIG. 10 shows an illustrative computing system adapted in accordance with the present disclosure.

FIG. 10 depicts a simplified block diagram of an example computer system 1000 according to certain embodiments. Computer system 1000 can be used to perform routing in accordance with the present disclosure. In some embodiments, computer system 1000 includes one or more processors 1002 that communicate with a number of peripheral devices via bus subsystem 1004. These peripheral devices include data subsystem 1006 (comprising memory subsystem 1008 and file storage subsystem 1010), user interface input devices 1012, user interface output devices 1014, and network interface subsystem 1016.

Bus subsystem 1004 can provide a mechanism that enables the various components and subsystems of computer system 1000 to communicate with each other as intended. Although bus subsystem 1004 is shown schematically as a single bus, alternative embodiments of the bus subsystem can utilize multiple busses.

Network interface subsystem 1016 can serve as an interface for communicating data between computer system 1000 and other computer systems or networks.

User interface input devices 1012 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 1000.

User interface output devices 1014 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 1000.

Data subsystem 1006 includes memory subsystem 1008 and file/disk storage subsystem 1010 represent non-transitory computer-readable storage media that can store program code and/or data, which when executed by processor 1002, can cause processor 1002 to perform operations in accordance with embodiments of the present disclosure.

Memory subsystem 1008 includes a number of memories including main random access memory (RAM) 1018 for storage of instructions and data during program execution and read-only memory (ROM) 1020 in which fixed instructions are stored. File storage subsystem 1010 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 1000 is illustrative and many other configurations having more or fewer components than system 1000 are possible.

The specification and drawings are, accordingly, to be regarded in an illustrative rather than restrictive sense. Other arrangements, embodiments, implementations and equivalents will be evident to those skilled in the art and may be employed without departing from the spirit and scope of the present disclosure as set forth in the following claims.

Further Examples

In accordance with the present disclosure, an apparatus includes one or more computer processors and a computer-readable storage medium having computer executable instructions that control the one or more computer processors to perform routing of circuit paths on a plurality of pixels associated with a circuit design, including computer executable instructions that control the one or more computer processors to: identify, from among the plurality of pixels, a start pixel associated with a first integrated circuit (IC) device, wherein each of the plurality of pixels is associated with a penalty value; identify, from among the plurality of pixels, an end pixel associated with a second IC device; add pixels, from among the plurality of pixels, to a set of pixels that represent a candidate path between the start pixel and the end pixel; and make a determination to reject or accept the candidate path based at least on electrical characteristics of the candidate path, wherein adding pixels includes identifying one or more adjacent pixels that are adjacent to a previously added pixel on the candidate path; selecting, from the one or more adjacent pixels, a pixel that is associated with a smallest penalty value, wherein the penalty value corresponds to a number of times the pixel has been associated with a rejected candidate path; and associating the selected pixel with the candidate path by adding the selected pixel to the set of pixels.

In some embodiments, the computer-readable storage medium further has instructions that control the one or more computer processors to add the start pixel to the set of pixels as a first pixel in the set of pixels; and designate the start pixel as the initial lead pixel on the candidate circuit path.

In some embodiments, the computer-readable storage medium further has instructions that control the one or more computer processors to increase a penalty value associated with each pixel on the rejected candidate circuit path in response to a determination to reject the candidate circuit path.

In some embodiments, the computer-readable storage medium further has instructions that control the one or more computer processors to identify a set of pixels that constitutes a second candidate circuit path, including allowing pixels that are on the rejected candidate circuit path to be on the second candidate circuit path in response to a determination to reject the candidate circuit path.

In some embodiments, the computer-readable storage medium further has instructions that control the one or more computer processors to select from the one or more adjacent pixels a pixel that is closest to the end pixel in response to there being more than one adjacent pixel that is associated with the smallest penalty value.

In some embodiments, adjacent pixels include pixels that are at North, East, South, and West directions relative to the lead pixel. Adjacent pixels can further include pixels that are at Up and Down directions relative to the lead pixel.

In accordance with the present disclosure, a method includes designating a start pixel, among a plurality of pixels on a circuit design, associated with a first integrated circuit (IC) device in the circuit design, wherein each of the plurality of pixels is associated with a penalty value; designating an end pixel, among the plurality of pixels, associated with a second IC device in the circuit design; determining, from among the plurality of pixels, a set of pixels that constitutes a candidate circuit path between the start pixel of the first IC device and the end pixel of the second IC device; and determining electrical characteristics of the candidate circuit path; and making a determination to reject or accept the candidate circuit path based on the electrical characteristics, wherein determining a set of pixels includes: (a) identifying one or more adjacent pixels that are adjacent to a lead pixel on the candidate circuit path; (b) selecting, from the one or more identified adjacent pixels, a pixel that is associated with a smallest penalty value; (c) adding the selected pixel to the set of pixels that constitutes the candidate circuit path; (d) designating the selected pixel as the lead pixel on the candidate circuit path; and repeating operations (a) to (d) until the end pixel is reached.

In some embodiments, the penalty value represents the number of times a pixel has been on a rejected candidate circuit path.

In some embodiments, the method further includes: adding the start pixel to the set of pixels as a first pixel in the set of pixels; and designating the start pixel as the initial lead pixel on the candidate circuit path.

In some embodiments, the method further includes, in response to a determination to reject the candidate circuit path, increasing a penalty value associated with each pixel on the rejected candidate circuit path.

In some embodiments, the method further includes, in response to a determination to reject the candidate circuit path, identifying a set of pixels that constitutes a second candidate circuit path, including allowing pixels that are on the rejected candidate circuit path to be on the second candidate circuit path.

In some embodiments, operation (b) includes, in response to there being more than one pixel that is associated with the smallest penalty value, selecting a pixel that is closest to the end pixel.

In some embodiments, adjacent pixels include pixels that are at North, East, South, and West directions relative to the lead pixel.

In some embodiments, adjacent pixels further include pixels that are at Up and Down directions relative to the lead pixel.

In accordance with the present disclosure, a non-transitory computer-readable storage medium having stored thereon computer executable instructions, which when executed by a computer device, cause the computer device to: identify, from among the plurality of pixels, a start pixel associated with a first integrated circuit (IC) device in a circuit design, wherein each of the plurality of pixels is associated with a penalty value; identify, from among the plurality of pixels, an end pixel associated with a second IC device; add pixels, from among the plurality of pixels, to a set of pixels that represent a candidate path between the start pixel and the end pixel; and make a determination to reject or accept the candidate path based at least on electrical characteristics of the candidate path, wherein adding pixels includes: identifying one or more adjacent pixels that are adjacent to a previously added pixel on the candidate path; selecting, from the one or more adjacent pixels, a pixel that is associated with a smallest penalty value, wherein the penalty value corresponds to a number of times the pixel has been associated with a rejected candidate path; and associating the selected pixel with the candidate path by adding the selected pixel to the set of pixels.

In some embodiments, the computer executable instructions, which when executed by the computer device, further cause the computer device to: add the start pixel to the set of pixels as a first pixel in the set of pixels; and designate the start pixel as the initial lead pixel on the candidate circuit path.

In some embodiments, the computer executable instructions, which when executed by the computer device, further cause the computer device to increase a penalty value associated with each pixel on the rejected candidate circuit path in response to a determination to reject the candidate circuit path.

In some embodiments, the computer executable instructions, which when executed by the computer device, further cause the computer device to identify a set of pixels that constitutes a second candidate circuit path, including allowing pixels that are on the rejected candidate circuit path to be on the second candidate circuit path in response to a determination to reject the candidate circuit path.

In some embodiments, adjacent pixels include pixels that are at North, East, South, West, Up, and Down directions relative to the lead pixel.

The above description illustrates various embodiments of the present disclosure along with examples of how aspects of these embodiments may be implemented. The above examples and embodiments should not be deemed to be the only embodiments, and are presented to illustrate the flexibility and advantages of the present disclosure as defined by the following claims. For example, although certain embodiments have been described with respect to particular process flows and steps, it should be apparent to those skilled in the art that the scope of the present disclosure is not strictly limited to the described flows and steps. Steps described as sequential may be executed in parallel, order of steps may be varied, and steps may be modified, combined, added, or omitted. As another example, although certain embodiments have been described using a particular combination of hardware and software, it should be recognized that other combinations of hardware and software are possible, and that specific operations described as being implemented in software can also be implemented in hardware and vice versa.

What is claimed is:

1. An apparatus comprising:
   one or more computer processors; and
   a computer-readable storage medium having computer executable instructions that control the one or more computer processors to perform routing of circuit paths on a plurality of pixels associated with a circuit design, including computer executable instructions that control the one or more computer processors to:
   identify, from among the plurality of pixels, a start pixel associated with a first integrated circuit (IC) device, wherein each pixel is associated with a penalty value that represents a number of rejected candidate paths that contain said each pixel;
   identify, from among the plurality of pixels, an end pixel associated with a second IC device;
   add pixels, from among the plurality of pixels, to a set of pixels that represents a candidate path between the start pixel and the end pixel, each added pixel being selected from among one or more pixels that are adjacent to a previously added pixel on the candidate path, the added pixel having a smallest penalty value among the one or more pixels; and
   make a determination to reject or accept the candidate path based at least on electrical characteristics of the candidate path.

2. The apparatus of claim 1, wherein the computer-readable storage medium further has instructions that control the one or more computer processors to:
   add the start pixel to the set of pixels as a first pixel in the set of pixels; and
   designate the start pixel as an initial lead pixel on the candidate circuit path.

3. The apparatus of claim 1, wherein the computer-readable storage medium further has instructions that control the one or more computer processors to increase a penalty value associated with each pixel on a rejected candidate circuit path in response to a determination to reject the candidate circuit path.

4. The apparatus of claim 1, wherein the computer-readable storage medium further has instructions that control the one or more computer processors to identify a set of pixels that constitutes a second candidate circuit path, including allowing pixels that are on the rejected candidate circuit path to be on the second candidate circuit path in response to a determination to reject the candidate circuit path.

5. The apparatus of claim 1, wherein the computer-readable storage medium further has instructions that control the one or more computer processors to select from the one or more adjacent pixels a pixel that is closest to the end pixel in response to there being more than one adjacent pixel that is associated with the smallest penalty value.

6. The apparatus of claim 1, wherein adjacent pixels include pixels that are at North, East, South, and West directions relative to the lead pixel.

7. The apparatus of claim 6, wherein adjacent pixels further include pixels that are at Up and Down directions relative to the lead pixel.

8. A method comprising:
   designating a start pixel, among a plurality of pixels on a circuit design, associated with a first integrated circuit (IC) device in the circuit design, wherein each of the plurality of pixels is associated with a penalty value;

designating an end pixel, among the plurality of pixels, associated with a second IC device in the circuit design;

determining, from among the plurality of pixels, a set of pixels that constitutes a candidate circuit path between the start pixel of the first IC device and the end pixel of the second IC device, including:
- (a) selecting a pixel that is associated with a smallest penalty value;
- (b) adding the selected pixel to the set of pixels that constitutes the candidate circuit path;
- (c) repeating operations (a) to (c) until the end pixel is reached;

determining electrical characteristics of the candidate circuit path; and making a determination to reject or accept the candidate circuit path based on the electrical characteristics.

9. The method of claim 8, wherein the penalty value represents the number of times a pixel has been on a rejected candidate circuit path.

10. The method of claim 8, the method further comprising:
adding the start pixel to the set of pixels as a first pixel in the set of pixels.

11. The method of claim 8, further comprising, in response to a determination to reject the candidate circuit path, increasing a penalty value associated with each pixel on the rejected candidate circuit path.

12. The method of claim 8, further comprising, in response to a determination to reject the candidate circuit path, identifying a set of pixels that constitutes a second candidate circuit path, including allowing pixels that are on the rejected candidate circuit path to be on the second candidate circuit path.

13. The method of claim 8, wherein operation (a) includes, in response to there being more than one pixel that is associated with the smallest penalty value, selecting a pixel that is closest to the end pixel.

14. The method of claim 8, wherein adjacent pixels include pixels that are at North, East, South, and West directions relative to a lead pixel.

15. The method of claim 8, wherein adjacent pixels further include pixels that are at Up and Down directions relative to a lead pixel.

16. A non-transitory computer-readable storage medium having stored thereon computer executable instructions, which when executed by a computer device, cause the computer device to:

identify, from among the plurality of pixels, a start pixel associated with a first integrated circuit (IC) device in a circuit design, wherein each of the plurality of pixels is associated with a penalty value;

identify, from among the plurality of pixels, an end pixel associated with a second IC device;

add pixels, from among the plurality of pixels, to a set of pixels that represents a candidate path between the start pixel and the end pixel, each added pixel being selected from among one or more pixels that are adjacent to a previously added pixel on the candidate path, the added pixel having a smallest penalty value among the one or more pixels; and make a determination to reject or accept the candidate path based at least on electrical characteristics of the candidate path.

17. The non-transitory computer-readable storage medium of claim 16, wherein the computer executable instructions, which when executed by the computer device, further cause the computer device to:
add the start pixel to the set of pixels as a first pixel in the set of pixels; and
designate the start pixel as an initial lead pixel on the candidate circuit path.

18. The non-transitory computer-readable storage medium of claim 16, wherein the computer executable instructions, which when executed by the computer device, further cause the computer device to increase a penalty value associated with each pixel on the rejected candidate circuit path in response to a determination to reject the candidate circuit path.

19. The non-transitory computer-readable storage medium of claim 16, wherein the computer executable instructions, which when executed by the computer device, further cause the computer device to identify a set of pixels that constitutes a second candidate circuit path, including allowing pixels that are on the rejected candidate circuit path to be on the second candidate circuit path in response to a determination to reject the candidate circuit path.

20. The non-transitory computer-readable storage medium of claim 16, wherein adjacent pixels include pixels that are at North, East, South, West, Up, and Down directions relative to the lead pixel.

* * * * *